(12) United States Patent
Ochs

(10) Patent No.: US 10,422,362 B2
(45) Date of Patent: Sep. 24, 2019

(54) FLUIDIC PUMP AND LATCH GATE

(71) Applicant: Facebook Technologies, LLC, Menlo Park, CA (US)

(72) Inventor: Garett Andrew Ochs, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 167 days.

(21) Appl. No.: 15/695,272

(22) Filed: Sep. 5, 2017

(65) Prior Publication Data
US 2019/0072119 A1    Mar. 7, 2019

(51) Int. Cl.
*F04B 43/00* (2006.01)
*F15C 1/06* (2006.01)
(Continued)

(52) U.S. Cl.
CPC .............. *F15C 1/06* (2013.01); *F04B 19/006* (2013.01); *F04B 53/1045* (2013.01); *F16K 99/0026* (2013.01); *F16K 99/0057* (2013.01); *F16K 99/0061* (2013.01); *G06F 1/163* (2013.01); *G06F 3/016* (2013.01); *F16K 2099/0094* (2013.01)

(58) Field of Classification Search
CPC ...... F15C 1/06; F04B 19/006; F04B 53/1045; F16K 99/0026; F16K 99/0057; F16K 99/0061; F16K 2099/0094; G06F 1/163; G06F 3/016
USPC ........... 137/565.13, 105, 565.36; 251/5, 61.1
See application file for complete search history.

(56) References Cited

U.S. PATENT DOCUMENTS

| 844,410 A | 2/1907 | Schauer |
| 2,069,261 A | 2/1937 | Georges |

(Continued)

FOREIGN PATENT DOCUMENTS

| CH | 522157 A | 4/1972 |
| EP | 2479466 A1 | 7/2012 |

(Continued)

OTHER PUBLICATIONS

PCT International Search Report, PCT Application No. PCT/US2017/052048, dated May 23, 2018, 18 pages.
(Continued)

*Primary Examiner* — Minh Q Le
(74) *Attorney, Agent, or Firm* — Fenwick & West LLP

(57) ABSTRACT

A fluidic device comprises a first channel conduit, a valve apparatus, and an additional element adjacent to the first channel conduit. The first channel conduit transports fluid from a first fluid entrance to a fluid exit. In one embodiment, the additional element is a pump chamber that receives fluid from a second fluid entrance and pumps fluid into the first channel conduit in accordance with fluid pressure. Alternatively, the additional elements include a second channel conduit and a neck of the first channel conduit. The first channel conduit and the second channel conduit share a common wall. Fluid pressure in the first channel conduit controls a valve apparatus. The value apparatus controls a rate of fluid flow in the first channel conduit by deforming the common wall to change a cross-sectional area of the neck, which changes a rate of fluid flow in the second channel conduit.

13 Claims, 6 Drawing Sheets

(51) Int. Cl.
| | |
|---|---|
| F04B 19/00 | (2006.01) |
| F16K 99/00 | (2006.01) |
| G06F 1/16 | (2006.01) |
| G06F 3/01 | (2006.01) |
| F04B 53/10 | (2006.01) |

(56) References Cited

U.S. PATENT DOCUMENTS

| | | |
|---|---|---|
| 2,241,086 A | 5/1941 | Gould |
| 2,345,693 A | 4/1944 | Wilson et al. |
| 2,590,215 A | 3/1952 | Sausa |
| 2,633,154 A | 3/1953 | Eastman |
| 2,715,009 A | 8/1955 | Beekley |
| 2,772,066 A | 11/1956 | Keeton et al. |
| 3,237,616 A | 3/1966 | Daigh et al. |
| 3,308,898 A | 3/1967 | Allen et al. |
| 3,441,245 A | 4/1969 | Holland et al. |
| 3,468,342 A | 9/1969 | Craft |
| 3,549,118 A | 12/1970 | Bluder |
| 3,610,274 A | 10/1971 | Levesque et al. |
| 3,695,576 A | 10/1972 | Kane et al. |
| 3,759,483 A | 9/1973 | Baxter |
| 3,918,674 A | 11/1975 | Sutter |
| 3,936,028 A | 2/1976 | Norton et al. |
| 3,951,168 A | 4/1976 | Roberts |
| 4,071,039 A | 1/1978 | Goof |
| 4,114,144 A | 9/1978 | Hyman |
| 4,300,748 A | 11/1981 | Kreeley |
| 4,322,054 A | 3/1982 | Campbell |
| 4,494,345 A | 1/1985 | Peterson |
| 4,642,833 A * | 2/1987 | Stoltz ............... E04H 4/1663 137/624.14 |
| 4,662,598 A * | 5/1987 | Weingarten ............ F16K 7/10 251/5 |
| 5,071,411 A | 12/1991 | Hillstead |
| 5,078,363 A | 1/1992 | Gregory |
| 5,131,423 A * | 7/1992 | Shaw .................... E03B 7/04 137/1 |
| 5,186,431 A | 2/1993 | Tamari |
| 5,354,162 A | 10/1994 | Burdea et al. |
| 5,441,231 A | 8/1995 | Payne et al. |
| 5,593,290 A * | 1/1997 | Greisch ............... F04B 19/006 417/478 |
| 6,053,191 A | 4/2000 | Hussey |
| 6,276,661 B1 * | 8/2001 | Laird ............... A61B 17/3462 137/317 |
| 6,361,015 B1 * | 3/2002 | Warmerdam .......... F16K 7/075 137/454.2 |
| 6,406,605 B1 | 6/2002 | Moles |
| 6,461,335 B1 | 10/2002 | Noecker |
| 6,474,623 B1 | 11/2002 | Davies |
| 6,505,810 B2 | 1/2003 | Abromaitis |
| 7,703,477 B2 | 4/2010 | Cook et al. |
| 7,998,121 B2 | 8/2011 | Stringham |
| 8,034,065 B2 | 10/2011 | Coe et al. |
| 8,286,933 B2 | 10/2012 | Hanada |
| 8,585,006 B2 | 11/2013 | Gabelgaard |
| 8,603,834 B2 | 12/2013 | Puleo et al. |
| 8,714,514 B2 | 5/2014 | Eijkelenberg et al. |
| 8,922,355 B2 | 12/2014 | Kusuura |
| 2002/0158217 A1 | 10/2002 | Inoue et al. |
| 2002/0169424 A1 | 11/2002 | Miles et al. |
| 2003/0010946 A1 | 1/2003 | Furukawa et al. |
| 2003/0141470 A1 | 7/2003 | Igarashi |
| 2003/0196695 A1 | 10/2003 | O'Connor et al. |
| 2004/0033108 A1 | 2/2004 | Raftis et al. |
| 2004/0056220 A1 | 3/2004 | Raftis |
| 2004/0075069 A1 * | 4/2004 | Bartoli ..................... F16K 7/07 251/5 |
| 2006/0058740 A1 | 3/2006 | Cise et al. |
| 2006/0243934 A1 | 11/2006 | Chung et al. |
| 2006/0245933 A1 * | 11/2006 | Balch ............. B01L 3/502707 417/182 |
| 2007/0170382 A1 | 7/2007 | Li et al. |
| 2008/0087853 A1 | 4/2008 | Kees |
| 2008/0264863 A1 | 10/2008 | Quake et al. |
| 2009/0007969 A1 | 1/2009 | Gundel |
| 2009/0145502 A1 | 6/2009 | Dirac et al. |
| 2009/0302244 A1 | 12/2009 | Wedel |
| 2010/0078584 A1 | 4/2010 | Van Den Bijgaart |
| 2010/0093559 A1 | 4/2010 | Fan et al. |
| 2010/0170572 A1 | 7/2010 | Sahoo et al. |
| 2010/0180970 A1 | 7/2010 | Welle |
| 2010/0260617 A1 | 10/2010 | Haertl |
| 2010/0266980 A1 | 10/2010 | Boyd et al. |
| 2011/0020140 A1 * | 1/2011 | Park ..................... F04B 19/006 417/48 |
| 2011/0045599 A1 | 2/2011 | Erickson et al. |
| 2012/0039770 A1 | 2/2012 | Namkoong et al. |
| 2012/0275829 A1 | 11/2012 | Salsman |
| 2013/0032210 A1 * | 2/2013 | Johnstone ............ F04B 19/006 137/1 |
| 2013/0255815 A1 | 10/2013 | Brinkmann et al. |
| 2013/0343913 A1 * | 12/2013 | Joshi ................... F04B 19/006 417/50 |
| 2014/0130920 A1 | 5/2014 | Fernandes et al. |
| 2014/0134001 A1 | 5/2014 | Uchida et al. |
| 2014/0197339 A1 * | 7/2014 | Mathies .............. F16K 99/0005 251/61.1 |
| 2014/0224335 A1 | 8/2014 | Hofmann |
| 2015/0267822 A1 | 9/2015 | Nissen |
| 2017/0300115 A1 | 10/2017 | Kerr et al. |
| 2017/0322629 A1 | 11/2017 | Pirasmepulkul et al. |
| 2018/0003319 A1 | 1/2018 | Besse et al. |
| 2018/0038513 A1 | 2/2018 | Baldea et al. |
| 2018/0158367 A1 | 6/2018 | Russomanno et al. |
| 2018/0161671 A1 | 6/2018 | Heubel |

FOREIGN PATENT DOCUMENTS

| | | |
|---|---|---|
| EP | 3351839 A2 | 7/2018 |
| KR | 10-2016-0098056 | 8/2016 |
| WO | WO 89/05417 A1 | 6/1989 |
| WO | WO 2010/104878 A1 | 9/2010 |
| WO | WO-2011/048521 A1 | 4/2011 |
| WO | WO 2016/205143 A1 | 12/2016 |
| WO | WO 2017/147004 A1 | 8/2017 |

OTHER PUBLICATIONS

PCT International Search Report and Written Opinion, PCT Application No. PCT/US2018/046486, dated Jan. 8, 2019, fifteen pages.

Devaraju, N.S.G.K. et al., "Pressure Driven Digital Logic in PDMS Based Microfluidic Devices Fabricated by Multilayer Soft Lithography," Lab Chip, The Royal Society of Chemistry, 2012, pp. 4809-4815, vol. 12.

European Partial Search Report, European Application No. 18151564.4, dated Jul. 17, 2018, 17 pages.

Eddington, D. et al., "Flow Control with Hydrogels," Advanced Drug Delivery Reviews, Feb. 10, 2004, pp. 199-210, vol. 56, No. 2.

Frank, P. et al., "Integrated Microfluidic Membrane Transistor Utilizing Chemical Information for On-Chip Flow Control," PLOS One, Aug. 29, 2016, e0161024, 17 pages, vol. 11, No. 8.

Yu, Q. et al., "Responsive Biomimetic Hydrogel Valve for Microfluidics," Applied Physics Letters, Apr. 23, 2001, pp. 2589-2591, vol. 78, No. 17.

PCT International Search Report and Written Opinion, PCT Application No. PCT/US2017/064683, dated Mar. 30, 2018, 19 pages.

United States Office Action, U.S. Appl. No. 15/706,578, dated Feb. 25, 2019, 13 pages.

United States Office Action, U.S. Appl. No. 15/683,937, dated Mar. 20, 2019, 15 pages.

United States Office Action, U.S. Appl. No. 15/824,294 dated Mar. 7, 2019, 23 pages.

European Partial Search Report, European Application No. 18158349.3, dated Sep. 20, 2018, 17 pages.

Mohan, R. et al., "Design Considerations for Elastomeric Normally Closed Microfluidic Valves," Sensors and Actuators B: Chemical:

(56) References Cited

OTHER PUBLICATIONS

International Journal Devoted to Research and Development of Physical and Chemical Transducers, Sep. 17, 2011, pp. 1216-1223, vol. 160, No. 11.

Perdigones, F.A. et al., "Correspondence Between Electronics and Fluids in MEMS: Designing Microfluidic Systems Using Electronics," IEEE Industrial Electronics Magazine, Dec. 1, 2014, pp. 6-17, vol. 8, No. 4.

European Patent Office, Extended European Search Report, European Patent Application No. 18192381, dated Apr. 12, 2019, 9 pages.

United States Office Action, U.S. Appl. No. 15/809,450, dated Jul. 25, 2019, 20 pages.

* cited by examiner

FLUIDIC PUMP AND LATCH GATE

BACKGROUND

The present disclosure generally relates to fluidic devices for head-mounted displays (HMD) and more specifically to using fluidic devices in virtual reality systems.

Virtual reality (VR) is a simulated environment created by computer technology and presented to a user, such as through a VR system. In some VR systems wearable devices (e.g., glove) allow a user to interact with virtual objects. Circuitry on such wearable devices can be complex, bulky, and in some cases heavy. As a result, conventional wearable devices can detract from a user's experience with a VR system.

SUMMARY

Embodiments of the disclosed invention include fluidic devices used in VR, augmented reality (AR) systems, and/or mixed reality (MR) systems. Fluidic devices are fluid handling devices that function analogous to electronic devices (e.g., an electrical field effect transistor, an electrical diode, a resistor, a capacitor, etc.). Additionally, fluidic devices are composable, meaning that fluidic devices may be coupled together to form a composite fluidic device (e.g., a decoder). In some embodiments, groups of fluidic devices are coupled together to act as controllers for a haptic apparatuses on wearable devices (e.g., haptic gloves) for a VR system.

In one embodiment, a fluidic device comprises a channel conduit, a pump chamber, and a valve apparatus. The channel conduit is configured to transport fluid from a first fluid entrance to a fluid exit. The first fluid entrance s an input for the fluid in the channel conduit. The fluid exit is an output for the fluid in the channel conduit. The pump chamber is configured to receive fluid from a second fluid entrance. The second fluid entrance is an input for the fluid in the pump chamber. The pump chamber includes a first inner surface and a second inner surface. A portion of the second inner surface of the pump chamber is adjacent to the channel conduit and a gap in the portion of the second inner surface of the pump chamber forms the first fluid entrance of the channel conduit. The valve apparatus is located within the pump chamber. The valve apparatus is configured to change position to control a rate of fluid flow from the pump chamber into the channel conduit via the first fluid entrance of the channel conduit in accordance with a fluid pressure within the pump chamber. Specifically, the valve apparatus is configured to induce a first flow rate of fluid from the pump chamber into the channel conduit via the first fluid entrance of the channel conduit in accordance with a first fluid pressure within the pump chamber. The valve apparatus is further configured to induce a second flow rate of the fluid from the pump chamber into the channel conduit via the first fluid entrance of the channel conduit in accordance with a second fluid pressure within the pump chamber, wherein the second fluid pressure is higher than the first fluid pressure.

In an alternative embodiment, a fluidic device comprises a first channel conduit, a second channel conduit, a neck, and a valve apparatus. The first channel conduit includes a first inner surface and a second inner surface. The first channel conduit is configured to transport fluid from a first fluid entrance to a first fluid exit. The first fluid entrance is an input for the fluid in the first channel conduit. The first fluid exit is an output for the fluid in the first channel conduit. The second channel conduit includes a third inner surface and a fourth inner surface. The second channel conduit is located adjacent to the first channel conduit such that the first channel conduit and the second channel conduit share a common wall. The common wall includes a portion of the second inner surface of the first channel conduit and a portion of the third inner surface of the second channel conduit. The second channel conduit is configured to transport fluid from a second fluid entrance to a second fluid exit. The second fluid entrance is an input for the fluid in the second channel conduit. The second fluid exit is an output for the fluid in the second channel conduit. The neck is located between the second fluid entrance of the second channel conduit and the second fluid exit of the second channel conduit. The neck comprises a portion of the fourth inner surface of the second channel conduit and a portion of the third inner surface of the second channel conduit that is included in the common wall. The valve apparatus is located within the first channel conduit. The valve apparatus is configured to control a rate of fluid flow in the second channel conduit in accordance with a fluid pressure in the first channel conduit by changing position to deform the common wall. Deformation of the common wall changes a cross-sectional area of the neck. This change in the cross-sectional area of the neck changes the rate of fluid flow in the second channel conduit. Specifically, the valve apparatus is configured to induce a first flow rate of the fluid in the second channel conduit in accordance with a first fluid pressure within the first channel conduit. The valve apparatus is further configured to induce a second flow rate of the fluid in the second channel conduit in accordance with a second fluid pressure within the first channel conduit, where the second fluid pressure is higher than the first fluid pressure.

Figure 1A:
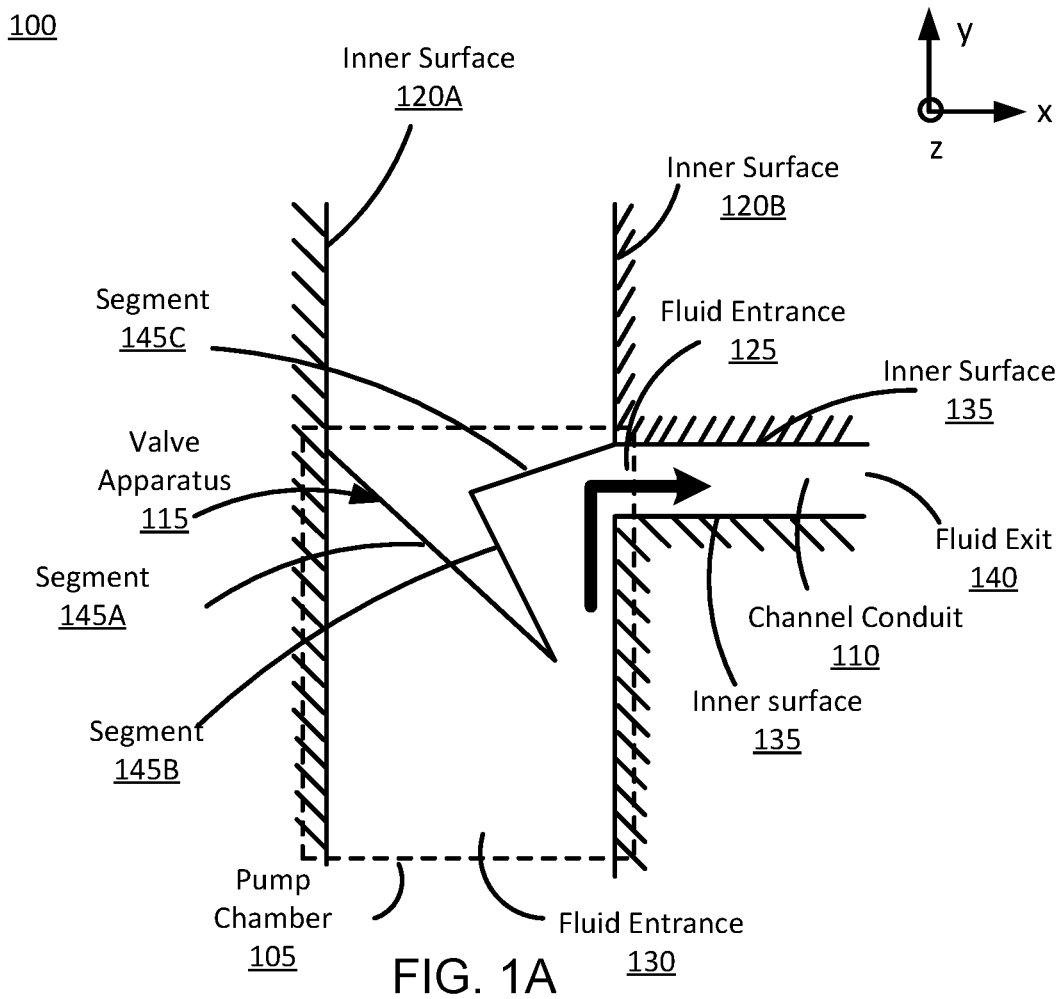
FIG. 1A is a cross section of an example fluidic device functioning as a pump in a low pressure state, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Embodiments of the disclosed invention include fluidic devices used in Virtual Reality (VR), augmented reality (AR) systems, and/or mixed reality (MR) systems. In some embodiments, fluidic devices are devices made of soft materials that use millimeter or smaller channels filled with fluid to transmit information, and the fluidic devices typically implement logic and have control actuators for transmitting information. In one embodiment, the fluidic devices are fluid handling devices that function analogous to electronic devices (e.g., an electrical transistor, an electrical diode, etc.) in electrical systems. For example, a fluidic device may be designed such that operates as a fluidic latching gate or pump. Additionally, fluidic devices are composable, meaning that fluidic devices may be coupled together to form a composite fluidic device. In some embodiments, groups of fluidic devices are coupled together to act as controllers for a haptic apparatuses on wearable devices (e.g., haptic gloves) for a VR system.

Detailed examples about fluidic devices that function as a latching gate and pump are described below with reference to FIGS. 1A-2D.

In one embodiment, a wearable device is implemented in a system for providing VR, AR, MR, or some combination thereof, experience to a user who wears the device. In more detail, the wearable device providing haptic feedback to the user in response to instructions from a console of the system. The wearable device includes at least one actuator, and a controller. The controller is composed of a plurality of fluidic devices as described above. In some embodiments, the fluidic devices are coupled together to form one or more composite fluidic devices. A composite fluidic device is a device formed from a plurality of fluidic devices that are coupled together to form a fluidic circuit, and the fluidic devices are "composable," in that a plurality of fluidic devices may be coupled together to generate larger structures. More details about the "composite fluidic device" can be found in, e.g., U.S. Patent Application No. 62/449,323 and U.S. Pat. App. No. 62/399,153 that are both hereby incorporated by reference in their entirety.

In some embodiments, a fluidic device functions as a pump. In these embodiments, the fluidic device includes a pump chamber including a fluid entrance, a valve apparatus inside the pump chamber, and a channel conduit including a fluid entrance that is connected to the pump chamber and a fluid exit. The fluid pressure applied on the valve apparatus controls the valve apparatus to periodically close and open the fluid entrance of the channel conduit, allowing the fluid from the pump chamber to be pumped into the channel conduit periodically.

In alternate embodiments, the fluidic device functions as a latching gate. In these embodiments, the fluidic device includes a first channel conduit bounded by an inner surface and having a fluid entrance and a fluid exit, a valve apparatus inside the first channel conduit, and a second channel conduit bounded by an inner surface and including a fluid entrance and a fluid exit. In particular, the valve apparatus is connected to the part of the inner surface of the first channel conduit that is adjacent to the second conduit channel. The fluid pressure from the fluid entrance of the first channel conduit applied on the valve apparatus controls the valve apparatus to pull the inner surface of the first channel conduit and further pull one side of the inner surface of the second channel conduit adjacent to the first channel conduit, allowing the second channel conduit to be opened and allowing the fluid inside the second channel conduit to flow from the fluid entrance to the fluid exit. Opening the second channel conduit in response to the fluid pressure applied to the valve apparatus makes the fluidic device in this mode function as a latching gate.

A flow rate indicates a speed of the fluid flowing from one end to the other end in a channel conduit of a fluidic device. An example volumetric flow rate is 60 ml/min. The flow rate in a channel conduit of a fluidic device may be affected by, e.g., a pressure of fluid from a corresponding fluid entrance.

An "open" state of a channel conduit refers to a state when the fluid in the channel conduit is flowing from one end to the other end at some open threshold flow rate. In contrast, a "closed" state of the channel conduit refers to the state when the flow of fluid in the channel conduit is less than some closed threshold flow rate, preventing the flow in the channel conduit to flow from one end to the other end. In addition, a "transitionary" state occurs when the channel conduit transitions from an open state to a closed state or from a closed state to an open state.

A "high pressure," a "transitionary" pressure, and a "low pressure" described here depend on the fluidic device structures and pressure of the fluid filling the fluidic device. In general, a "low pressure" is a pressure of the fluid that falls within a low pressure range, a "high pressure" is a pressure of the fluid that falls within a high pressure range, and a "transitionary" pressure is a pressure of the fluid that falls between the low pressure range and the high pressure range. Note, in some embodiments there is a high pressure range and a low pressure range, but not a transitionary range. Moreover, different components of a fluidic device may have different high pressure ranges, different transitionary pressure ranges, and different low pressure ranges. For example, a high pressure range of a gate may be significantly less than a high pressure range of a source.

Turning, now to a discussion of an example fluidic device 100 that functions as a pump, FIG. 1A is a cross section of an example fluidic device 100 functioning as a pump in a low pressure state, in accordance with an embodiment. The fluidic device 100 includes a pump chamber 105, a channel conduit 110, and a valve apparatus 115.

The pump chamber 105 is part of the fluidic device 100 and is defined by an inner surface 120 (120A and 120B collectively referred as 120) and in the cross section illustrated in FIG. 1A, one side of the inner surface 120A and the other side of the inner surface 120B are shown. In particular, the side of the inner surface 120B is adjacent to the channel conduit 110, and there is a gap on the side of inner surface 120A that forms the fluid entrance 125 of the channel conduit, as described below. In one embodiment, the inner surface 120 of the pump chamber 105 is made of thin membranes. The pump chamber 105 also includes a fluid entrance 130 with fluid from the fluid entrance 130 flowing into the pump chamber. As more fully described below, the fluid inside the pump chamber 105 is directed towards and into the channel conduit 110 when the channel conduit is in an open state. The pump chamber 105 also includes a valve apparatus 115 as described below.

The channel conduit 110 is a part of the fluidic device 100 that encloses a channel with fluid flowing inside the channel. The channel conduit 110 is defined by an inner surface 135. The channel conduit 110 includes a fluid entrance 125 and a fluid exit 140 and the fluid inside the channel conduit flows from the fluid entrance to the fluid exit when the channel conduit is in an open state. The channel conduit 110 is connected to the side of the inner surface 120B of the pump chamber 105 via the fluid entrance 125 of the channel conduit.

The valve apparatus 115 is part of the fluidic device 100. The valve apparatus 115 includes multiple segments that are coupled together such that two coupled segments may rotate at a coupling point of the two coupled segments. The rotation may occur along an axis parallel to the Z-axis, and may be clockwise or anticlockwise. In one embodiment, the valve apparatus 130 include three segments labelled as segment 145A, 145B and 145C shown in FIG. 1A and FIG. 1C. Among the multiple segments, segment 145A is coupled to the side of inner surface 120A, segment 145C is coupled to the side of the inner surface 120B, and segment 145B is coupled to the segment 145A and the segment 145C. The portion of the segment 145A coupled to the inner surface 120A and the portion of the segment 145C coupled to the inner surface 120B are coupled at respective coupling points. And at each coupling point rotation may occur around an axis parallel to the Z-axis and the rotation may be clockwise or anticlockwise. The location of the segment 145B in the pump chamber 105 may change with fluid pressure. The segments 145A and 145C may also change position as well, except for the coupling points of the segments 145A, 145C with the inner surfaces 120A and 120C, respectively, which remain fixed. In one embodiment, the valve apparatus 115 is made of deformable materials such as plastics. The three segments 145A, 145B, 145C of the valve apparatus 115 can move according to the fluid pressure inside the pump chamber 105, and more specifically, according to the fluid pressure from the fluid entrance 130 of the pump chamber. As one example, with an increasing fluid pressure from the fluid entrance 130, causes the segment 145A to rotate counter clockwise around its coupling point with the inner surface 120A, and the segment 145C to rotate clockwise around its coupling point with the inner surface 120B. The movement of the segments 145A and 145C causes the segment 145B to also move in a positive y direction and also rotate counterclockwise. In FIG. 1A, the fluidic device 100 is in a low pressure state with a corresponding open state of the channel conduit 110.

A low pressure state of the fluidic device 100 indicates that the fluid pressure inside the pump chamber 105 is below a certain threshold, and for example, the flow rate of the fluid may be below a certain threshold. In a low pressure state, without fluid pressure from the fluid entrance 130 applied on the valve apparatus 115 reaching or exceeding the threshold, the valve apparatus is positioned away from the side of the inner surface 120B in a certain distance, and in particular as shown in FIG. 1A, the segment 145A and segment 145B is off the side of the inner surface 120B. Accordingly, the fluid entrance 125 of the channel conduit 110 is open, which allows the fluid inside the pump chamber 105 to be directed towards and to flow into the channel conduit, and the channel conduit is in an open state.

A transitionary state of the fluidic device 100 is a state between a high pressure state and a low pressure state. As one example, during a transitionary state of the fluidic device 100 from a high pressure state to a low pressure state, the fluid pressure inside the pump chamber 105 is gradually decreasing until the gap that is originally closed becomes open to allow the channel conduit 110 to transfer from a closed state to an open state. As another example, during a transitionary state of the fluidic device 100 from a low pressure state to a high pressure state, the fluid pressure inside the pump chamber 105 is gradually increasing until the gap that is originally open becomes closed to allow the channel conduit 110 to transfer from an open state to a closed state.

Figure 1B:
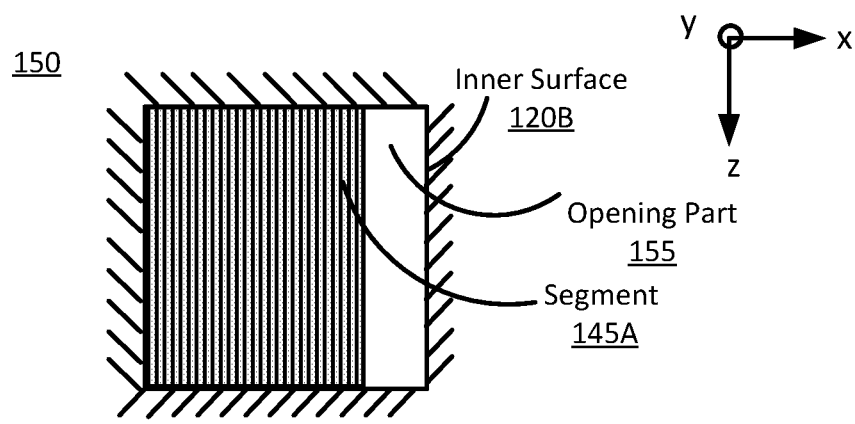
FIG. 1B is a cross section of the example fluidic device shown in FIG. 1A from the perspective view of its fluid entrance, in accordance with an embodiment.

FIG. 1B is a cross section 150 of the example fluidic device 100 shown in FIG. 1A from the perspective view of its fluid entrance 130, in accordance with an embodiment. As shown in FIG. 1B, the cross section 150 is a rectangular shape. In FIG. 1B, the channel conduit 110 is in an open state, the segment 145A is off the side of the inner surface 120B, and there is an opening part 155 that allows the fluid from the fluid entrance 130 to be directed towards and into the channel conduit 110, and this indicates the fluidic device 100 is in an open state. In alternate embodiments, the cross section 150 from the fluid entrance 130 can have different shapes, for example, circular, square, or some other shape. Note—the channel conduit 110 is not shown in this view. However, the channel conduit 110 may have a rectangular cross section or, alternatively, circular, square, or some other shape.

Figure 1C:
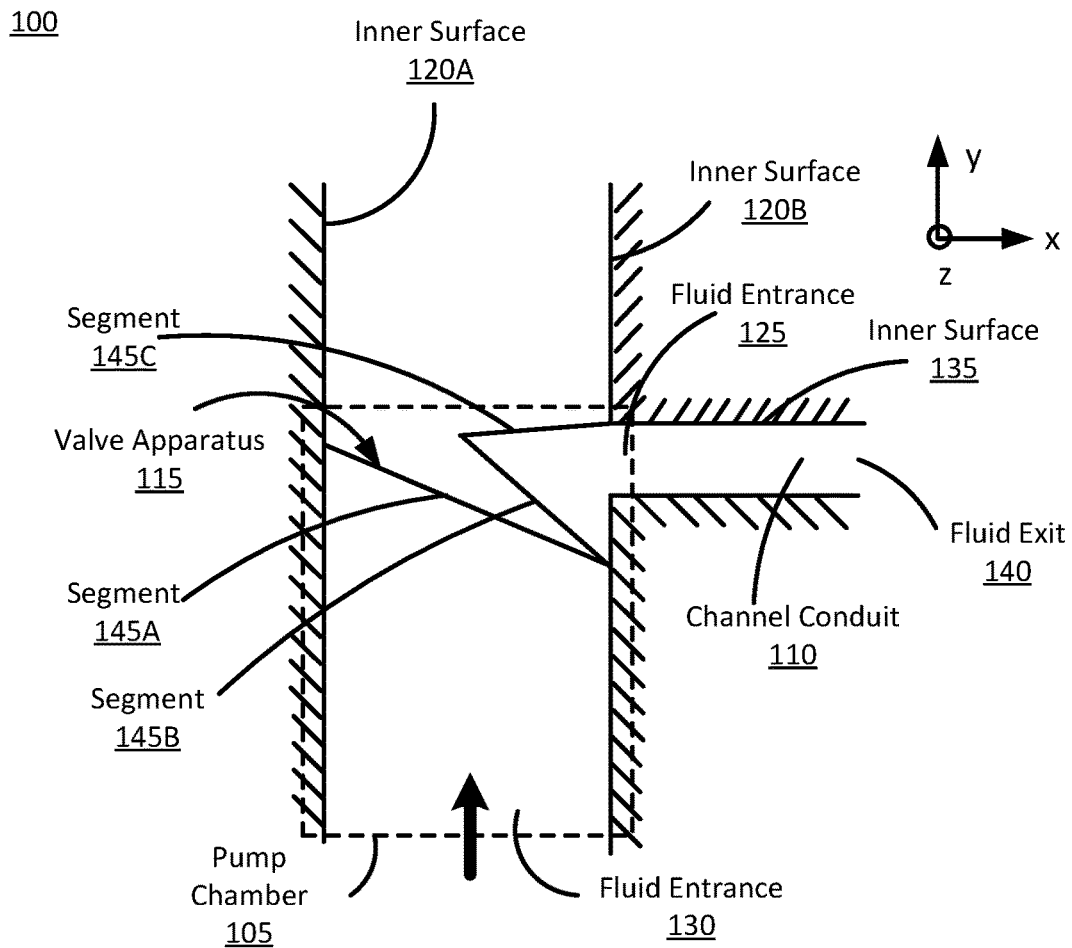
FIG. 1C is a cross section of the example fluidic device shown in FIG. 1A in a high pressure state, in accordance with an embodiment.

FIG. 1C is a cross section of the example fluidic device 100 shown in FIG. 1A in a high pressure state, in accordance with an embodiment. In the embodiment of FIG. 1C, the fluidic device 100 is in a high pressure state. A high pressure state of the fluidic device 100 indicates that the fluid pressure inside the pump chamber 105 reaches or is above a certain threshold, and for example, the flow rate of the fluid may be above a certain threshold. In a high pressure state, fluid pressure applied on the valve apparatus 115 pushes the segment 145A and segment 145B of the valve apparatus 115 away from the fluid entrance 130. The fluid pressure also pushes a portion of the segment 145A and segment 145B of the valve apparatus 115 against the side of the inner surface 120B. This closes the fluid entrance 125 of the channel conduit 110 and accordingly prevents fluid inside the pump chamber 105 from flowing into the channel conduit 110 and places the channel conduit in a closed state.

Figure 1D:
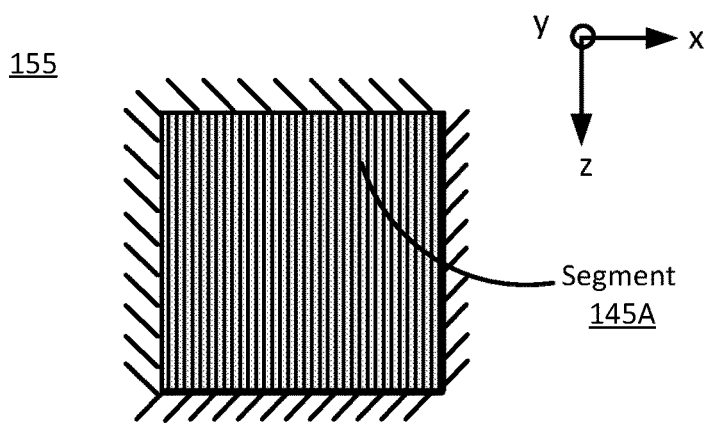
FIG. 1D is a cross section of the example fluidic device shown in FIG. 1C from the perspective view of its fluid entrance, in accordance with an embodiment.

FIG. 1D is a cross section 155 of the example fluidic device shown in FIG. 1C from the perspective view of its fluid entrance 130, in accordance with an embodiment. In FIG. 1D, the conduit channel 120 is in a closed state, a portion of the segment 145A is pushed against the side of the inner surface 120B, and accordingly closes the fluid entrance 125 of the channel conduit, preventing fluid inside the pump chamber 105 from flowing into the channel conduit.

In one embodiment, with constant pressure impulse from the fluid inside the pump chamber 105, the segments 145A, 145B, 145C of the valve apparatus 115 periodically move towards y axis to be pushed against the inner surface 120B and move away from the inner surface 120B. This periodically movement of the valve apparatus 115 cuts and allows fluid into the channel conduit 110, and makes the channel conduit 110 in a closed state and in an open state periodically. The periodic change from a closed state to an open state (or from an open state to a closed state) of the channel allows the fluidic device 100 to function as a pump.

Figure 2A:
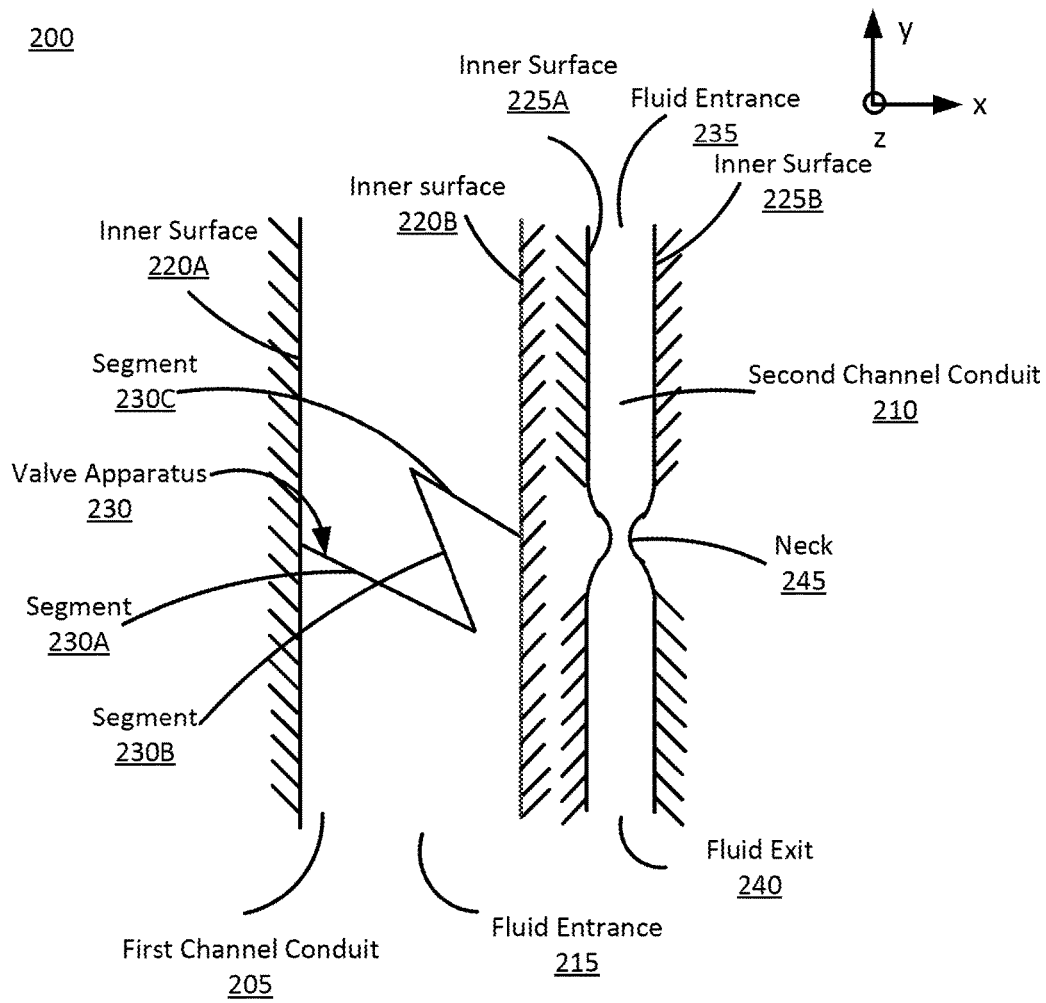
FIG. 2A is a cross section of an example fluidic device functioning as a latching gate in a low pressure state, in accordance with an embodiment.

FIG. 2A is a cross section of an example fluidic device 200 functioning as a latching gate in a low pressure state, in accordance with an embodiment. The fluidic device 200 includes a first channel conduit 205, a second channel conduit 210 that is isolated from the first channel conduit 205, and a valve apparatus 230 inside the first channel conduit. The fluidic device 200 shown in FIG. 2A is merely one example, and in alternative embodiments not shown, the fluidic device 200 may include additional/fewer or different components.

The first channel conduit 205 encloses a channel with fluid flowing inside the channel. The first channel conduit 205 is defined by an inner surface 220 (220A and 220B collectively referred as 220) and in the cross section illustrated in FIG. 2A, two sides of the inner surface 220A and 220B are shown. The first channel conduit 205 includes a fluid entrance 215 from which fluid flows into the first channel conduit. The first channel conduit 205 and the second channel conduit 210 share a common wall. The common wall includes a portion of the inner surface 220B in the first channel conduit and a portion of the inner surface 225A in the second channel conduit. The common wall is also deformable in that the inner surface 220B and/or the inner surface 225A can be pulled or pushed (e.g., along an axis parallel to the X-axis) by, e.g., a force exerted on the common wall by the value apparatus 230.

The valve apparatus 230 is part of the fluidic device 200 that, in one embodiment, includes multiple segments. In one embodiment, the valve apparatus 230 includes three segments labelled as segment 230A, 230B and 230C shown in FIG. 2A and FIG. 2C. The three segments 230A, 230B, 230C are coupled together such that two coupled segments may rotate at a coupling point between the two coupled segments. The portion of the segment 230A coupled to the inner surface 220A and the portion of the segment 220C coupled to the inner surface 220B are coupled at respective coupling points. The segment 230B is coupled to both the segment 230A and the segment 230C at respective coupling points. And at each coupling point rotation may occur around an axis parallel to the Z-axis and the rotation may be clockwise or anticlockwise. As explained below, the location of the segment 230B in the first channel conduit 205 may change with fluid pressure. The segments 230A and 230C may also change position as well, except for the coupling points of the segments 230A, 230C with the inner surfaces 220A and 220C, respectively, which remain fixed. Among the multiple segments, segment 230A is coupled to the side of inner surface 220A, segment 230C is coupled to the side of the inner surface 220B, and segment 230B is connecting the segment 230A and the segment 230C. In one embodiment, the valve apparatus 230 is made of deformable materials such as plastics. The segments 230A, 230B, 230C of the valve apparatus 230 can move according to the fluid pressure inside the first channel conduit 205, and more specifically, according to the fluid pressure from the fluid entrance 215 of the first channel conduit. As one example, with an increasing fluid pressure (above a threshold value) from the fluid entrance 215, causes the segment 230A to rotate counter clockwise around its coupling point with the inner surface 220A, and the segment 230C to rotate counterclockwise around its coupling point with the inner surface 220B. The movement of the segments 230A and 230C causes the segment 230B to also move in a positive y direction and also rotate counterclockwise. In FIG. 2A, the fluidic device 200 is in a low pressure state with a corresponding closed state of the second channel conduit 210.

The second channel conduit 210 is positioned adjacent to the first channel conduit 205. The second channel conduit 210 is defined by an inner surface 225 (inner surface 225A and 225B collectively referred as inner surface 225), and in the cross section illustrated in FIG. 2A, two sides of the inner surface 225A and 225B are shown. The second channel conduit 210 includes a fluid entrance 235 and a fluid exit 240 with fluid flowing from the fluid entrance to the fluid exit when the second channel conduit 210 is in an open state. The second channel conduit 210 also includes a neck 245 between the fluid entrance 235 and the fluid exit 240. The neck 245 is a location in the second channel conduit 210 where area of a cross section of the second channel conduit 210 can be adjusted (i.e., increased or decreased) to adjust fluid flow through the second channel conduit 210. The neck 245 includes a common wall with the first channel conduit 205. The common wall includes portions of the inner surface 220B and the inner surface 225A. An adjustment force on the portion of the inner surface 220B that is part of the common wall can adjust the cross section of the neck 245. As discussed in detail below the adjustment force is applied by the valve apparatus 230 based in part on the fluid pressure in the first channel conduit 205.

The fluidic device 200 can be in a low pressure state (i.e., the second channel conduit 210 is in a closed state), a high pressure state (i.e., the second channel conduit 210 is in an open state), or a transitionary state (i.e., the second channel conduit 210 is between an open and a closed state).

A low pressure state of the fluidic device 200 indicates that the first channel conduit 205 is below a certain threshold, and for example, the flow rate of the fluid may be below a certain threshold. In a low pressure state, without large enough pressure applied on the valve apparatus 230 such that the valve apparatus 215 does not pull the inner surface 220B away from its original position. Accordingly, the cross section of the neck 245 remains small, which restricts fluid flow (and in some embodiments stops) from the fluid entrance 235 to the fluid exit 240 of the second channel conduit 210, and places the second channel conduit 210 in a closed state.

A transitionary state of the fluidic device 200 is a state between a high pressure state and a low pressure state. As one example, during a transitionary state of the fluidic device 200 from a low pressure state to a high pressure state, the fluid pressure inside the first channel conduit 205 is increasing, resulting in more force in the −X direction by the valve apparatus 230 on the inner surface 220B. This causes a deformation in the inner surface 220B that causes a cross section of the neck 245 to increase. This allows the second channel conduit 210 to transfer from a closed state to an open state. As another example, during a transitionary state of the fluidic device 200 from a high pressure state to a low pressure state, the fluid pressure inside the first channel conduit 205 is gradually decreasing, resulting in less force in the −X direction by the valve apparatus 230 on the inner surface 220B. This causes less deformation in the inner surface 220B and causes the cross section of the neck 245 to decrease and places the second channel conduit 210 in a closed state.

Figure 2B:
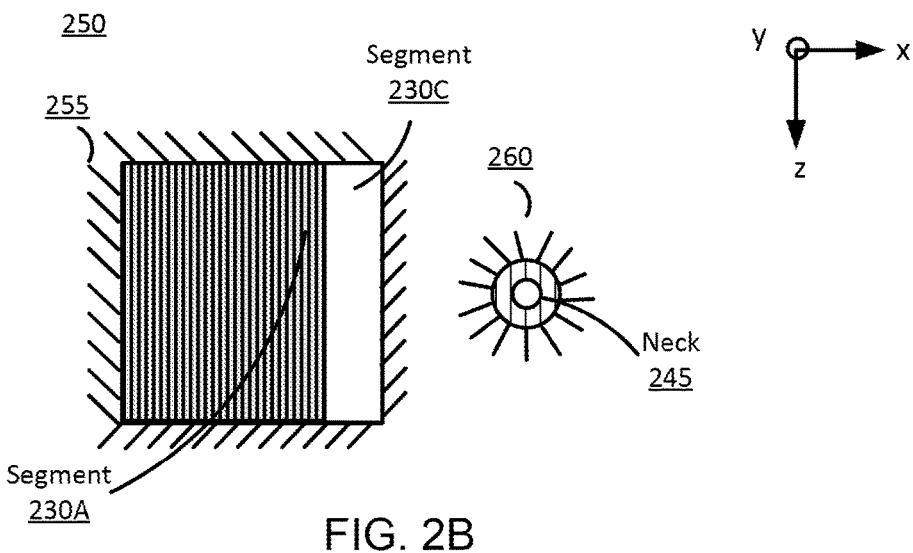
FIG. 2B is a cross section of the example fluidic device shown in FIG. 2A from the perspective view of its fluid entrance, in accordance with an embodiment.

FIG. 2B is a cross section 250 of the example fluidic device 200 shown in FIG. 2A from the perspective view of its fluid entrance 215, in accordance with an embodiment. As shown in FIG. 2B, the cross section 250 includes two parts 255 and 260. The cross section 255 corresponds to the first channel conduit 205 and the cross section 260 corresponds to the second channel conduit 210. As shown in FIG. 2B, the cross section 255 has a rectangular shape, and the cross section has a circular shape. In FIG. 2B, the fluidic device 200 is in a low pressure state and the second channel conduit 210 is in a closed state. In alternate embodiments, the cross section 255 and the cross section 260 can have different shapes, for example, elliptical, square, or some other shape.

Figure 2C:
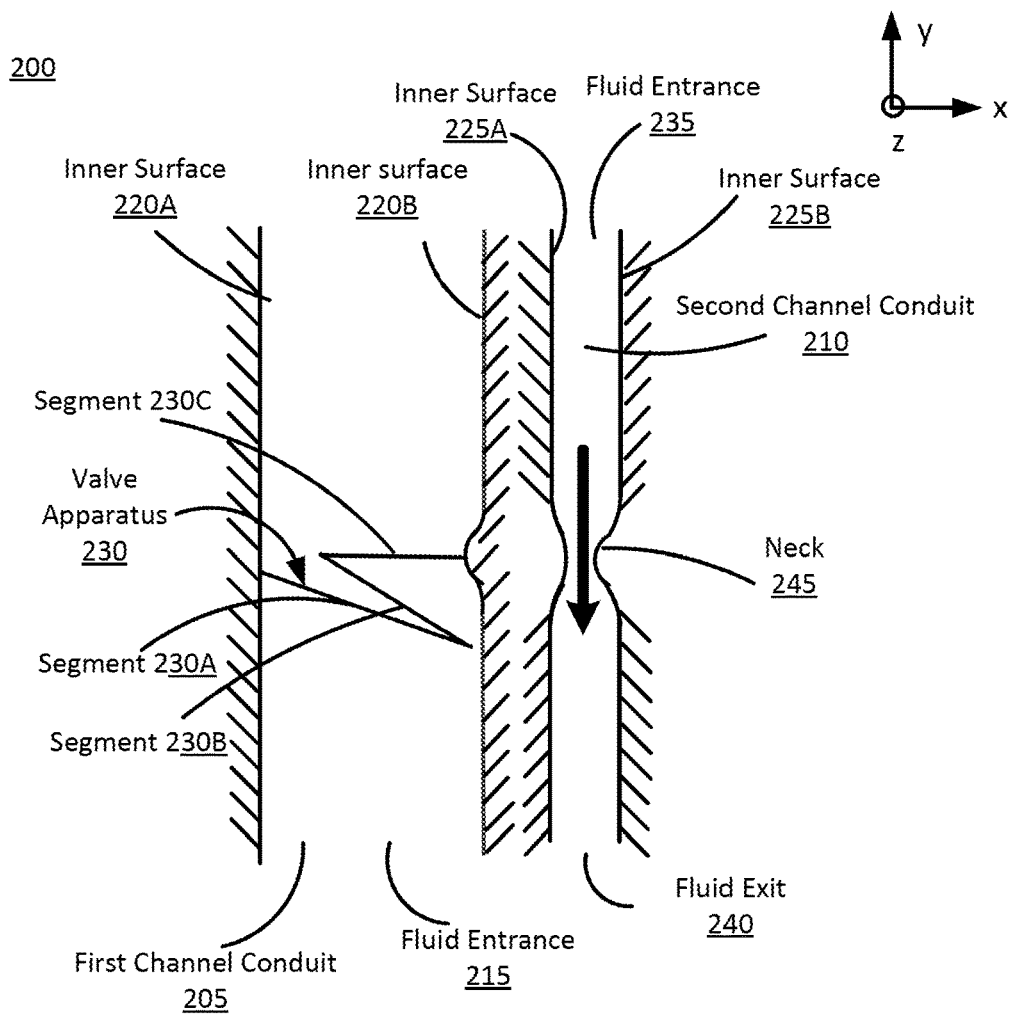
FIG. 2C is a cross section of the example fluidic device shown in FIG. 2A in a high pressure state, in accordance with an embodiment.

FIG. 2C is a cross section of the example fluidic device 200 shown in FIG. 2A in a high pressure state, in accordance with an embodiment. In the embodiment of FIG. 2C, the fluidic device 200 is in a high pressure state, and the pressure of the fluid from the fluid entrance 215 of the first channel conduit 205 has reached or exceeded a certain threshold to make the inner surface 220B move in the negative X direction, and accordingly, the inner surface 225A of the second channel conduit 210 also move in the negative X direction. This deformation causes the cross section of the neck 229 to increase and a flow rate of fluid through the second channel conduit 210 to increase. Once a threshold flow rate is reached, the second channel conduit 210 is in an open state.

A high pressure state of the fluidic device 200 indicates that the fluid pressure inside the first channel conduit 205 is above a certain threshold. In a high pressure state, with large enough pressure applied on the valve apparatus 230, the valve apparatus imparts an amount of force to make the inner surface 220B of the first channel conduit 205 to move towards the negative x axis. Accordingly, due to the common wall shared by the first channel conduit 205 and the second channel conduit 210, the inner surface 225A of the second channel conduit 210 also moves towards the negative x axis, and the cross section of the neck 229 increases. This allows fluid inside the second channel conduit 210 to flow from the fluid entrance 235 to the fluid exit 240 and makes the second channel conduit 210 an open state.

As the fluid pressure inside the first channel conduit 205 reaches the threshold pressure, the cross section of the neck 245 increases to a point sufficient to place the second channel conduit 210 in an open state. Accordingly, by controlling fluid pressure in the first channel conduit 205, to affect fluid flow within the second channel conduit 210 the fluidic device 200 functions as a latching gate.

Figure 2D:
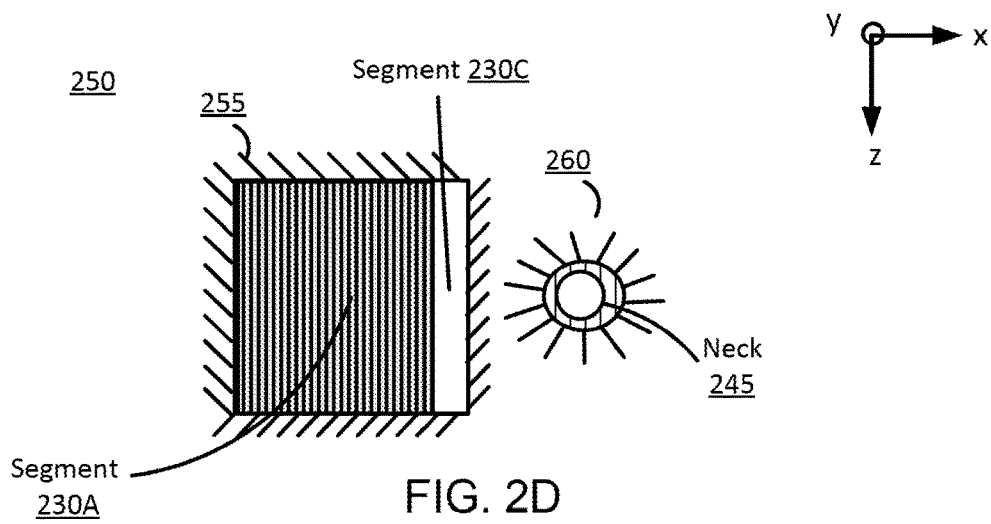
FIG. 2D is a cross section of the example fluidic device shown in FIG. 2C from the perspective view of its fluid entrance, in accordance with an embodiment.

FIG. 2D is a cross section 250 of the example fluidic device 200 shown in FIG. 2A from the perspective view of its fluid entrance 215, in accordance with an embodiment. As shown in FIG. 2B, the cross section 250 includes two parts 255 and 260. The cross section 255 corresponds to the first channel conduit 205 and the cross section 260 corresponds to the second channel conduit 210. As shown in FIG. 2B, the cross section 255 has a rectangular shape, and the cross section has a round shape. In FIG. 2B, the fluidic device 200 is in a high pressure state and the second channel conduit 210 is in an open state. In alternate embodiments, the cross section 255 and the cross section 260 can have different shapes, for example, elliptical, square, or some other shape.

Figure 3:
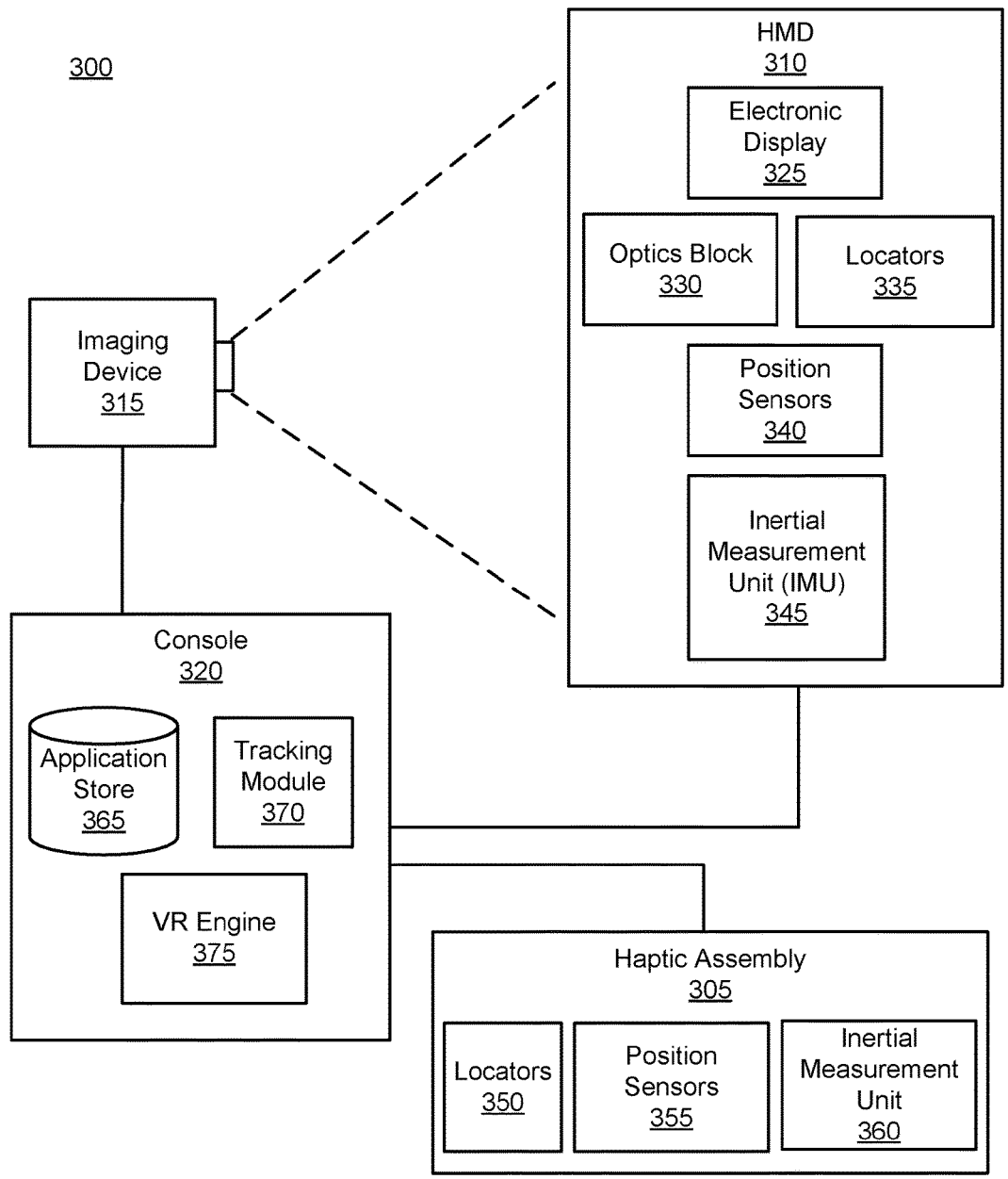
FIG. 3 is a block diagram of a system environment including a VR system, in accordance with an embodiment.

FIG. 3 is a block diagram of a system 300 including a haptic assembly 305, in accordance with one embodiment. The system 300 may operate in a VR environment, an augmented reality (AR) environment, a mixed reality (MR) environment, or some combination thereof. The system 300 comprises a head-mounted display (HMD) 310, an imaging device 315, and the haptic assembly 305 that are each coupled to a console 320. While FIG. 3 shows an example system 300 including one HMD 310, one imaging device 315, and one haptic assembly 305, in other embodiments any number of these components may be included in the system 300. For example, there may be multiple HMDs 310 each having an associated haptic assembly 305 and being monitored by one or more imaging devices 315, with each HMD 310, haptic assembly 305, and imaging device 315 communicating with the console 320. In alternative configurations, different and/or additional components may be included in the system 300. Additionally, in some embodiments the system 300 may be modified to include other system environments, such as an AR system environment.

The HMD 310 presents media to a user. Examples of media presented by the HMD 310 include one or more images, video, audio, or some combination thereof. In some embodiments, audio is presented via an external device (e.g., speakers and/or headphones) that receives audio information from the HMD 310, the console 320, or both, and presents audio data based on the audio information. The HMD 310 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 310 may also act as an augmented reality (AR) and/or mixed reality (MR) headset. In these embodiments, the HMD 310 augments views of a physical, real-world environment with computer-generated elements (e.g., images, video, sound, etc.).

The HMD 310 includes an electronic display 325, an optics block 330, one or more locators 335, one or more position sensors 340, and an inertial measurement unit (IMU) 345.

The optics block 330 magnifies received light from the electronic display 325, corrects optical errors associated with the image light, and the corrected image light is presented to a user of the HMD 310. An optical element may be an aperture, a Fresnel lens, a convex lens, a concave lens, a filter, or any other suitable optical element that affects the image light emitted from the electronic display 325. Moreover, the optics block 330 may include combinations of different optical elements. In some embodiments, one or more of the optical elements in the optics block 330 may have one or more coatings, such as anti-reflective coatings.

There are objects located in specific positions on the HMD 305 relative to one another and relative to a specific reference point on the HMD 305. A locator 320 may be a light emitting diode (LED), a corner cube reflector, a reflective marker, a type of light source that contrasts with an environment in which the HMD 305 operates, or some combination thereof. In embodiments where the locators 320 are active (i.e., an LED or other type of light emitting device), the locators 320 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 320 are located beneath an outer surface of the HMD 310, which is transparent to the wavelengths of light emitted or reflected by the locators 335 or is thin enough to not substantially attenuate the wavelengths of light emitted or reflected by the locators 335. Additionally, in some embodiments, the outer surface or other portions of the HMD 310 are opaque in the visible band of wavelengths of light. Thus, the locators 335 may emit light in the IR band under an outer surface that is transparent in the IR band but opaque in the visible band.

The IMU 345 is an electronic device that generates fast calibration data based on measurement signals received from one or more of the position sensors 340. A position sensor 340 generates one or more measurement signals in response to motion of the HMD 310. Examples of position sensors 340 include: one or more accelerometers, one or more gyroscopes, one or more magnetometers, another suitable type of sensor that detects motion, a type of sensor used for error correction of the IMU 345, or some combination thereof. The position sensors 340 may be located external to the IMU 345, internal to the IMU 345, or some combination thereof.

Based on the one or more measurement signals from one or more position sensors 340, the IMU 345 generates fast calibration data indicating an estimated position of the HMD 310 relative to an initial position of the HMD 310. For example, the position sensors 340 include multiple accelerometers to measure translational motion (forward/back, up/down, left/right) and multiple gyroscopes to measure rotational motion (e.g., pitch, yaw, roll). In some embodiments, the IMU 345 rapidly samples the measurement signals and calculates the estimated position of the HMD 310 from the sampled data. For example, the IMU 345 integrates the measurement signals received from the accelerometers over time to estimate a velocity vector and integrates the velocity vector over time to determine an estimated position of a reference point on the HMD 310. Alternatively, the IMU 345 provides the sampled measurement signals to the HMD 310, which determines the fast calibration data. The reference point is a point that may be used to describe the position of the HMD 310. While the reference point may generally be defined as a point in space; however, in practice the reference point is defined as a point within the HMD 310 (e.g., a center of the IMU 345).

The IMU 345 receives one or more calibration parameters from the console 320. As further discussed below, the one or more calibration parameters are used to maintain tracking of the HMD 310. Based on a received calibration parameter, the IMU 345 may adjust one or more IMU parameters (e.g., sample rate). In some embodiments, certain calibration parameters cause the IMU 345 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 315 generates slow calibration data in accordance with calibration parameters received from the console 320. Slow calibration data includes one or more images showing observed positions of the locators 335 that are detectable by the imaging device 315. The imaging device 315 may include one or more cameras, one or more video cameras, any other device capable of capturing images including one or more of the locators 335, or some combination thereof. Additionally, the imaging device 315 may include one or more filters (e.g., used to increase signal to noise ratio). The imaging device 315 is designed to detect light emitted or reflected from locators 335 in a field of view of the imaging device 315. In embodiments where the locators 335 include passive elements (e.g., a retroreflector), the imaging device 315 may include a light source that illuminates some or all of the locators 335, which retroreflect the light towards the light source in the imaging device 315. Slow calibration data is communicated from the imaging device 315 to the console 320, and the imaging device 315 receives one or more calibration parameters from the console 320 to adjust one or more imaging parameters (e.g., focal length, focus, frame rate, ISO, sensor temperature, shutter speed, aperture, etc.).

The haptic assembly 305 is a device that allows a user to send action requests to the console 320. An action request is a request to perform a particular action. For example, an action request may be to start or end an application or to perform a particular action within the application. The haptic assembly 305 also provides haptic feedback including a perception of contacting a virtual object. In one embodiment, the haptic assembly 305 includes a plurality of composable fluidic devices that form one or more composite fluidic devices. The composite fluidic devices may be used to, e.g., address actuators included in the haptic assembly 305 according to the haptic feedback signal from the console 320. In one embodiment, as more fully described below in FIG. 4, the haptic assembly 305 is a haptic glove through which the console 320 enables a user to interact with a virtual object.

In FIG. 3, the haptic assembly 305 further includes locators 350, one or more position sensors 355, and an inertial measurement unit (IMU) 360. In some embodiments, the locators 350, one or more position sensors 355, an inertial measurement unit (IMU) 380 are installed to determine a physical position or movement of the haptic assembly 305. In addition, the haptic assembly 305 receives, from the console 320, a haptic feedback signal corresponding to haptic feedback to the user. The haptic assembly 305 provides to the user with the haptic feedback of touching a virtual object in a virtual space, according to the haptic feedback signal. Specifically, the haptic assembly 305 prevents or enables a physical movement of a portion of a user in contact with the virtual object in the virtual space. For example, if a user's finger is in contact with a virtual object (e.g., a virtual wall) in a virtual space, the haptic assembly 305 prevents a physical movement of the user finger to move in a direction through the virtual object in the virtual space. Accordingly, the user can receive a perception of contacting the virtual object.

In one embodiment, the haptic feedback signal indicates a position or a portion of the haptic assembly 305 to be actuated, and an amount of actuation of the position or the portion of the haptic assembly 305 for providing haptic feedback. In this embodiment, the amount of actuation is determined by, e.g., the console 320, according to a virtual position of the haptic assembly 305 corresponding to a physical position of the haptic assembly 305 and a virtual position of a virtual object in a virtual space. The haptic assembly 305 provides tactile perception of a user touching the virtual object according to the amount of actuation indicated by the haptic feedback signal.

The locators 350 are objects located in specific positions on the haptic assembly 305 relative to one another and relative to a specific reference point of the haptic assembly 305 on the haptic assembly 305. A locator 350 is substantially similar to a locator 335 except that the locator 350 is part of the haptic assembly 305. Additionally, in some embodiments, the outer surface or other portions of the haptic assembly 305 are opaque in the visible band of wavelengths of light. Thus, the locators 350 may emit light in the IR band under an outer surface that is transparent in the IR band but opaque in the visible band.

A position sensor 355 generates one or more measurement signals in response to motion of the haptic assembly 305. The position sensors 355 are substantially similar to the positions sensors 340, except that the position sensors 355 are part of the haptic assembly 305. The position sensors 355 may be located external to the IMU 360, internal to the IMU 360, or some combination thereof.

Based on the one or more measurement signals from one or more position sensors 355, the IMU 360 generates fast calibration data of the haptic assembly 305 indicating an estimated position of the haptic assembly 305 relative to an initial position of the haptic assembly 305. For example, the position sensors 355 include multiple accelerometers to measure translational motion (forward/back, up/down, left/right) and multiple gyroscopes to measure rotational motion (e.g., pitch, yaw, roll) of the haptic assembly 305. In some embodiments, the IMU 360 rapidly samples the measurement signals and calculates the estimated position of the haptic assembly 305 from the sampled data. For example, the IMU 360 integrates the measurement signals received from the accelerometers over time to estimate a velocity vector and integrates the velocity vector over time to determine an estimated position of a reference point of the haptic assembly 305. Alternatively, the IMU 360 provides the sampled measurement signals to the console 320, which determines the fast calibration data of the haptic assembly 305. The reference point of the haptic assembly 305 is a point that may be used to describe the position of the haptic assembly 305. While the reference point of the haptic assembly 305 may generally be defined as a point in space; however, in practice the reference point of the haptic assembly 305 is defined as a point within the haptic assembly 305 (e.g., a center of the IMU 360).

The IMU 360 receives one or more calibration parameters of the haptic assembly 305 from the console 320. As further discussed below, the one or more calibration parameters of the haptic assembly 305 are used to maintain tracking of the haptic assembly 305. Based on a received calibration parameter of the haptic assembly 305, the IMU 360 may adjust one or more IMU parameters (e.g., sample rate). In some embodiments, certain calibration parameters of the haptic assembly 305 cause the IMU 360 to update an initial position of the reference point of the haptic assembly 305 so it corresponds to a next calibrated position of the reference point of the haptic assembly 305. Updating the initial position of the reference point of the haptic assembly 305 as the next calibrated position of the reference point of the haptic assembly 305 helps reduce accumulated error associated with the determined estimated position.

The console 320 provides media to the HMD 310 for presentation to the user in accordance with information received from one or more of: the imaging device 315, the VR headset 305, and the haptic assembly 305. In the example shown in FIG. 3, the console 320 includes an application store 365, a tracking module 370, and a virtual reality (VR) engine 375. Some embodiments of the console 320 have different modules than those described in conjunction with FIG. 3. Similarly, the functions further described below may be distributed among components of the console 320 in a different manner than is described here.

The application store 365 stores one or more applications for execution by the console 320. An application is a group of instructions, that when executed by a processor, generates content for presentation to the user. Content generated by an application may be in response to inputs received from the user via movement of the HMD 310 or the haptic assembly 305. Examples of applications include: gaming applications, conferencing applications, video playback application, or other suitable applications.

The tracking module 370 calibrates the VR system 300 using one or more calibration parameters and may adjust one or more calibration parameters to reduce error in determination of the position of the HMD 310. For example, the tracking module 370 adjusts the focus of the imaging device 315 to obtain a more accurate position for observed locators on the HMD 310. Moreover, calibration performed by the tracking module 370 also accounts for information received from the IMU 345. Additionally, if tracking of the HMD 310 is lost (e.g., the imaging device 315 loses line of sight of at least a threshold number of the locators 335), the tracking module 370 re-calibrates some or all of the system 300.

The tracking module 370 tracks movements of the HMD 310 using slow calibration information from the imaging device 315. The tracking module 370 determines positions of a reference point of the HMD 310 using observed locators from the slow calibration information and a model of the HMD 310. The tracking module 370 also determines positions of a reference point of the HMD 310 using position information from the fast calibration information. Additionally, in some embodiments, the tracking module 370 may use portions of the fast calibration information, the slow calibration information, or some combination thereof, to predict a future location of the HMD 310. The tracking module 370 provides the estimated or predicted future position of the HMD 310 to the VR engine 375.

The VR engine 375 executes applications within the system 300 and receives position information, acceleration information, velocity information, predicted future positions, or some combination thereof of the HMD 310 from the tracking module 370. Based on the received information, the VR engine 375 determines content to provide to the HMD 310 for presentation to the user. For example, if the received information indicates that the user has looked to the left, the VR engine 375 generates content for the HMD 310 that mirrors the user's movement in a virtual environment. Additionally, the VR engine 375 performs an action within an application executing on the console 320 in response to an action request received from the haptic assembly 305 and provides feedback to the user that the action was performed. The provided feedback may be visual or audible feedback via the HMD 310 or haptic feedback via the haptic assembly 305.

Figure 4:
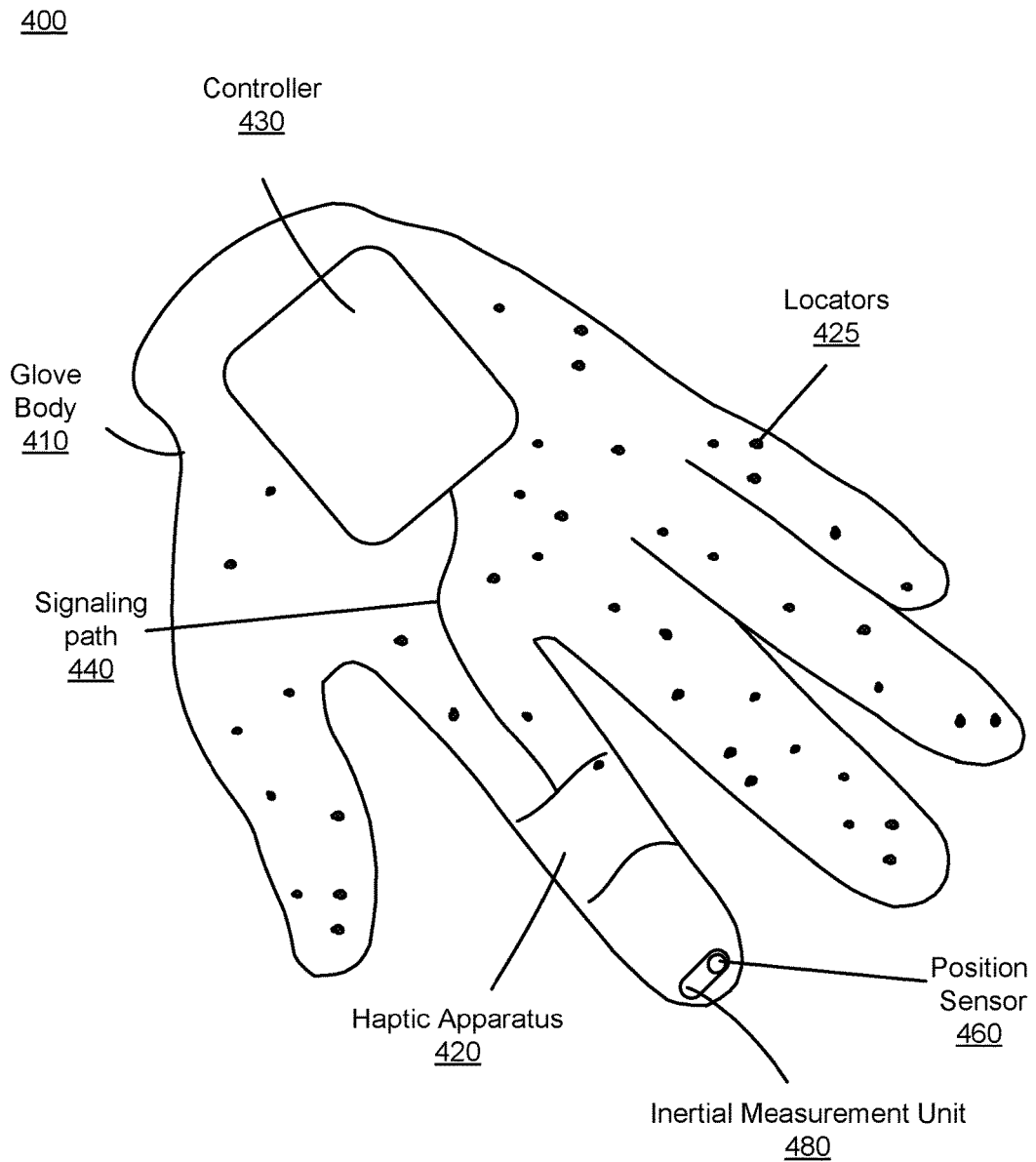
FIG. 4 is an example haptic glove for interacting with virtual objects, in accordance with an embodiment.

FIG. 4 is an example haptic glove 400 for interacting with virtual objects, in accordance with an embodiment. The haptic glove 400 shown in FIG. 4 includes a glove body 410, a haptic apparatus 420, a controller 430, a signaling path 440, one or more locators 425, a position sensor 460 and an IMU 480. Only signaling path 440, one haptic apparatus 420, one position sensor 460 and one IMU 480 are shown in FIG. 4 to simplify the description. In alternative embodiments not shown, the haptic glove 400 can include multiple tubes, position sensors and haptic apparatus that are connected to the controller 430, for example, for each finger of the haptic glove 400, a set of haptic apparatus, position sensors and IMUs may be connected to the controller. Likewise, the functions performed by the various entities of the haptic glove 400 may differ in different embodiments. Additionally, the various entities of the haptic glove 400 may be positioned in different places on the glove body 410. As one example, additional haptic apparatuses 420 and the position sensors 460 are located at different parts of the glove body 410. As another example, the haptic apparatuses 420 are coupled to or wrap the entire fingers of the glove body 410. As another example, the controller 430 is coupled to a different portion of the glove body 410 corresponding to, for example a wrist or a palm.

The glove body 410 is an apparatus covering a hand, for example, a garment that is coupled to the position sensor 460, the haptic apparatus 420, the controller 430, and the signaling 440. In one embodiment, the position sensor 460 is coupled to a corresponding finger of the glove body 410 (e.g., a portion corresponding to a fingertip of the glove body); the haptic apparatus 420 is coupled to a corresponding finger portion (e.g., a portion corresponding to a joint between two phalanges) of the glove body 410; and the controller 430 is coupled to a portion of the glove body 410 corresponding to a back of a hand (i.e., dorsal side). The signaling path 440 is coupled between the controller 430 and the haptic apparatus 420. In one embodiment, one or more of these components are placed beneath an outer surface of the glove body 410, thus are not visible from the outside.

Additionally or alternatively, some of these components are placed on an outer surface of the glove body 410, and are visually detectable.

In one embodiment, the haptic glove 400 may be the haptic assembly 440 shown in FIG. 3 and the locators 425, the position sensor 460 and the IMU 480 of the haptic glove 400 may be the corresponding locators 350, position sensors 355 and IMUs 380 of the haptic assembly 305 shown in FIG. 3. A user's hand movement can be detected and tracked according to fast calibration data from the IMU 480 and/or slow calibration of the locators 425 from the imaging device 315. Moreover, haptic feedback including a perception of a user contacting a virtual object can be provided to the user by the controller 430, signaling 440, and haptic apparatus 420.

The haptic apparatus 420 provides haptic feedback including a perception of a user touching a virtual object. In one embodiment, the haptic apparatus 420 is actuated according to instructions received from the controller 430. In one embodiment, the haptic apparatus 420 is coupled to a portion corresponding to a joint between two phalanges of the glove body 410. In another embodiment, the haptic apparatus 420 covers the entire glove body 410 or are placed on other parts (e.g., an area corresponding to a joint between two different fingers) of the glove body 410. The haptic apparatus 420 may be, for example, a plurality of actuators.

The controller 430 is a device that provides instructions for the haptic apparatus 420 to perform specific functions. The controller 430 may receive instructions or haptic feedback from the console 320 and actuates the haptic apparatus 420 accordingly. The controller 430 includes a plurality of fluidic devices that generate instructions for one or more haptic apparatuses (e.g., actuators). As discussed in detail above, with regard to FIGS. 1A-2B fluidic devices are composable and may be coupled together to form composite fluidic devices, like, e.g., a decoder. Decoders, for example, can help reduce a number of logical connections within the controller 430 and/or connections to the haptic apparatus 420. Accordingly, the controller 430 may be composed of a plurality of fluidic devices, including various combinations of those described above with regard to FIGS. 1A-2D. Similar to the controllers 430, the signaling path 440 may be a tube or a fluidic device formed from fluidic devices with reference to FIGS. 1A-2B.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A fluidic device comprising:
 a channel conduit configured to transport fluid from a first fluid entrance to a fluid exit, wherein the first fluid entrance is an input for the fluid in the channel conduit, and the fluid exit is an output for the fluid in the channel conduit;
 a pump chamber configured to receive fluid from a second fluid entrance, wherein the second fluid entrance is an input for the fluid in the pump chamber, the pump chamber including a first inner surface and a second inner surface, a portion of the second inner surface of the pump chamber adjacent to the channel conduit and a gap in the portion of the second inner surface of the pump chamber forming the first fluid entrance of the channel conduit; and
 a valve apparatus located within the pump chamber, the valve apparatus configured to change position to control a rate of fluid flow from the pump chamber into the channel conduit via the first fluid entrance of the channel conduit in accordance with a fluid pressure within the pump chamber, the valve apparatus configured to induce a first flow rate of fluid from the pump chamber into the channel conduit via the first fluid entrance of the channel conduit in accordance with a first fluid pressure within the pump chamber and a second flow rate of fluid from the pump chamber into the channel conduit via the first fluid entrance of the channel conduit in accordance with a second fluid pressure within the pump chamber, that is higher than the first fluid pressure.

2. The fluidic device of claim 1, wherein the valve apparatus comprises a plurality of segments, the plurality of segments including a first segment, and a second segment, and the first segment is coupled to the first inner surface of the pump chamber at a first coupling point and the second segment is coupled to the second inner surface of the pump chamber at a second coupling point, and each segment of the plurality of segments is coupled to at least one other segment at an additional coupling point.

3. The fluidic device of claim 2, wherein the plurality of segments further includes a third segment, and the first segment is coupled to the third segment at a third coupling point, and the third segment is also coupled to the second segment at a fourth coupling point, and the second segment is also coupled to the third segment at the fourth coupling point.

4. The fluidic device of claim 3, wherein an increasing fluid pressure within the pump chamber causes the plurality of segments to rotate about their respective coupling points acting to pump fluid into the channel conduit.

5. The fluidic device of claim 2, wherein coupling points on the first inner surface of the pump chamber and the second inner surface of the pump chamber are fixed in place.

6. The fluidic device of claim 1, whereby periodic changes in pressure within the pump chamber from the first fluid pressure to the second fluid pressure that cause the valve apparatus to periodically pump fluid into the channel conduit.

7. A fluidic device comprising:
a first channel conduit including a first inner surface and a second inner surface, the first channel conduit configured to transport fluid from a first fluid entrance to a first fluid exit, wherein the first fluid entrance is an input for the fluid in the first channel conduit, and the first fluid exit is an output for the fluid in the first channel conduit;
a second channel conduit including a third inner surface and a fourth inner surface, the second channel conduit located adjacent to the first channel conduit such that the first channel conduit and the second channel conduit share a common wall, the common wall including a portion of the second inner surface of the first channel conduit and a portion of the third inner surface of the second channel conduit, the second channel conduit configured to transport fluid from a second fluid entrance to a second fluid exit, wherein the second fluid entrance is an input for the fluid in the second channel conduit, and the second fluid exit is an output for the fluid in the second channel conduit;
a neck located between the second fluid entrance of the second channel conduit and the second fluid exit of the second channel conduit, the neck comprising a portion of the fourth inner surface of the second channel conduit and a portion of the third inner surface of the second channel conduit that is included in the common wall; and
a valve apparatus located within the first channel conduit, the valve apparatus configured to control a rate of fluid flow in the second channel conduit in accordance with a fluid pressure in the first channel conduit by changing position to deform the common wall, whereby deformation of the common wall changes a cross-sectional area of the neck, changing the rate of fluid flow in the second channel conduit, wherein the valve apparatus is configured to induce a first flow rate of the fluid in the second channel conduit in accordance with a first fluid pressure within the first channel conduit and a second flow rate of the fluid in the second channel conduit in accordance with a second fluid pressure within the first channel conduit, and the second fluid pressure is higher than the first fluid pressure.

8. The fluidic device of claim 7, wherein the first fluid entrance of the first channel conduit is adjacent to the second fluid exit of the second channel conduit and the first fluid exit of the first channel conduit is adjacent to the second fluid entrance of the second cannel conduit.

9. The fluidic device of claim 7, wherein the valve apparatus comprises a plurality of segments, the plurality of segments including a first segment and a second segment, and the first segment is coupled to the first inner surface of the first channel conduit at a first coupling point and the second segment is coupled to the second inner surface of the channel conduit at a second coupling point, and each segment of the plurality of segments is coupled to at least one other segment at an additional coupling point.

10. The fluidic device of claim 9, wherein each segment is configured to rotate about at least one coupling point.

11. The fluidic device of claim 9, wherein the plurality of segments further comprises a third segment, and the first segment is coupled to the third segment at a third coupling point, and the third segment is coupled to the second segment at a fourth coupling point.

12. The fluidic device of claim 11, wherein coupling points on the first inner surface of the first channel conduit and the second inner surface of the first channel conduit are fixed in place.

13. The fluidic device of claim 9, wherein an increasing fluid pressure to the second fluid pressure causes the plurality of segments to move in a manner that deforms the common wall.

* * * * *